United States Patent
Wester et al.

(10) Patent No.: US 7,795,340 B2
(45) Date of Patent: Sep. 14, 2010

(54) AQUEOUS DISPERSIONS OF WATER-SOLUBLE POLYMERS WITH COMBLIKE STABILIZERS

(75) Inventors: Bettina Wester, Mannheim (DE); Volker Braig, Weinheim-Luetzelsachsen (DE); Werner Gauweiler, Lustadt (DE); Marc Leduc, Mannheim (DE); Stefan Becker, Mannheim (DE); Robert Feuerhake, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 251 days.

(21) Appl. No.: 12/091,527

(22) PCT Filed: Oct. 25, 2006

(86) PCT No.: PCT/EP2006/067736
§ 371 (c)(1),
(2), (4) Date: Apr. 25, 2008

(87) PCT Pub. No.: WO2007/051736
PCT Pub. Date: May 10, 2007

(65) Prior Publication Data
US 2008/0287596 A1    Nov. 20, 2008

(30) Foreign Application Priority Data
Nov. 3, 2005    (DE) ........................ 10 2005 052 924

(51) Int. Cl.
*C08L 51/00*    (2006.01)
*C09D 5/02*    (2006.01)

(52) U.S. Cl. ...................... 524/504; 524/521
(58) Field of Classification Search ................. 524/504
See application file for complete search history.

(56) References Cited

U.S. PATENT DOCUMENTS

| | | | |
|---|---|---|---|
| 7,034,068 B1 | 4/2006 | Negele et al. | |
| 7,084,200 B2 | 8/2006 | Leduc et al. | |
| 7,297,733 B2 | 11/2007 | Negele et al. | |
| 2003/0212183 A1 | 11/2003 | Struck et al. | |
| 2005/0014887 A1* | 1/2005 | Leduc et al. | 524/504 |

FOREIGN PATENT DOCUMENTS

| | | |
|---|---|---|
| DE | 198 51 024 A1 | 5/2000 |
| WO | 00/27893 | 5/2000 |
| WO | 02/38639 A1 | 5/2002 |
| WO | 03/046024 A1 | 6/2003 |
| WO | 03/097703 A1 | 11/2003 |
| WO | 2004/029110 A2 | 4/2004 |

\* cited by examiner

*Primary Examiner*—Ling-Siu Choi
*Assistant Examiner*—Hui Chin
(74) *Attorney, Agent, or Firm*—Oblon, Spivak, McClelland, Maier & Neustadt, L.L.P.

(57) ABSTRACT

The invention relates to aqueous dispersions of water-soluble polymers of N-vinyl-carboxamides, which are substantially salt-free and comprise anionic polymeric stabilizers having a comb-like molecular structure, processes for the preparation of the dispersions in the presence of anionic polymeric stabilizers having a comb-like molecular structure and the use of the dispersions as retention aids or fixing agents in papermaking.

20 Claims, No Drawings

AQUEOUS DISPERSIONS OF WATER-SOLUBLE POLYMERS WITH COMBLIKE STABILIZERS

The invention relates to aqueous dispersions of water-soluble polymers of N-vinyl-carboxamides, which are substantially salt-free and comprise anionic polymeric stabilizers having a comb-like molecular structure, process for the preparation of the dispersions in the presence of anionic polymeric stabilizers having a comb-like molecular structure and the use of the dispersions as retention aids or fixing agents in papermaking.

Further embodiments of the present invention are evident from the claims, the description and the examples. Of course, the abovementioned features of the subject matter of the invention and those still to be explained below can be used not only in the combination stated in each case but also in other combinations without departing from the scope of the invention.

Water-soluble polymers are as a rule used in the form of aqueous solutions. Their provision as an aqueous solution is, however, complicated in that only 0.5-1% strength solutions can have very high viscosities, complicating, for example, transport, metering and very generally the handling of such solutions. The formulation of water-soluble polymers as a water-in-oil (W/O) dispersion permits substantially higher polymer contents, but the presence of an organic solvent is not advantageous for many applications. Furthermore, the provision of water-soluble polymers in solid form, for example as powder, is problematic since the material first has to be dissolved in water before use, which can take a very long time and is often incomplete.

The preparation of relatively highly concentrated aqueous solutions of water-soluble polymers is possible through the use of suitable assistants. These assistants lead in such aqueous solutions to a partial separation of the actual water-soluble polymer phase and the aqueous phase. The polymer is displaced from the aqueous phase by so-called displacers (or precipitating agents) and the finely divided polymer particles forming are as a rule stabilized by so-called stabilizers (or dispersants). Although the polymer content of these dispersions may be 25%, the polymer present in the form of a separate, finely divided phase contributes insignificantly to the viscosity of the dispersion.

DE 198 51 024 discloses salt-free aqueous dispersions of N-vinylcarboxamides with, for example, polyethylene glycol and polyvinylpyrrolidone as polymeric assistants, which exhibit relatively high viscosities. The dispersions remain stable even after hydrolysis with mineral acids.

The prior art discloses polymeric stabilizers having a comb-like molecular structure. These are obtainable either by a graft copolymerization or by the copolymerization of macromonomers.

For example WO 03/046024 describes aqueous polyvinylformamide dispersions which are stabilized with graft copolymers, in which side chains comprising compounds having at least two ethylenically unsaturated double bonds were grafted by free radical polymerization onto a polyalkylene glycol main chain as the backbone. WO 2004/029110 discloses salt-free polyvinylformamide dispersions which comprise graft copolymers as stabilizers, which are obtainable by grafting N-vinylcarboxamides onto polyalkylene glycols or polytetrahydrofurans as the backbone. In these cases, a relatively nonpolar polyalkylene glycol main chain has therefore been provided with relatively polar side chains.

In contrast, polymeric stabilizers having the opposite distribution of polarities are obtained by homo- or copolymerization of monomer mixtures comprising macromonomers. WO 02/38639 discloses, for example, cationic stabilizers for the polymerization of cationic and nonionic vinyl monomers, which have a comb-like molecular structure and which are obtainable by copolymerization of a cationic vinyl monomer with polyalkylene glycol monoallyl ethers. The preparation of the dispersion is effected in a salt-containing solution, and the vinyl monomers to be polymerized must be continuously further metered in the course of the reaction in order to ensure a homogeneous reaction phase.

US 2003/0212183 describes a process for the preparation of aqueous salt-containing polymer dispersions from nonionic acrylamides and cationic acrylic acid and acrylamide monomers, stabilizers used being copolymers of cationic vinyl monomers and nonionic monomers, e.g. acrylates of polyethylene glycol monomethyl ethers.

WO 03/097703 discloses aqueous polymer dispersions obtained from water-soluble cationic and nonionic monomers, copolymers of cationic monomers and monoallyl- or monovinylpolyethers being used as stabilizers, and costabilizers additionally being used.

It was an object of the invention to provide aqueous dispersions of water-soluble polymers comprising N-vinylcarboxamide units, which have a low viscosity, are virtually salt-free and formed from the homogeneous phase without a part of the monomers having to be continuously metered in during the reaction.

The object is achieved, according to the invention, by aqueous dispersions of water-soluble polymers of N-vinylcarboxamides if the dispersions comprise, as a stabilizer, at least one anionic water-soluble polymer having a comb-like molecular structure, which is obtainable by copolymerization of a monomer mixture which comprises macromonomers.

The proportions of water-soluble polymer of N-vinylcarboxamides and anionic stabilizer can be varied within wide ranges in the dispersions according to the invention. 100 parts by weight of the dispersion according to the invention comprise, for example, (i) from 5 to 50 parts by weight of water-soluble polymers of N-vinylcarboxamides and (ii) from 1 to 30 parts by weight of at least one anionic stabilizer having a comb-like molecular structure and from 94 to 20 parts by weight of water.

According to the invention water-soluble polymers of N-vinylcarboxamides are understood as meaning homo- and copolymers which comprise, incorporated in the form of polymerized units, units of the formula

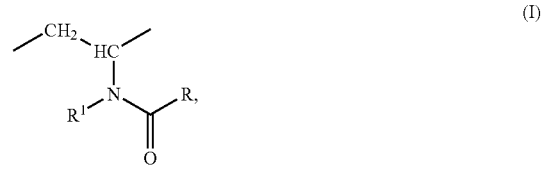

where R and R$^1$ are H or CH$_3$. The polymers are prepared by homo- or copolymerization of, for example, N-vinylformamide, N-vinylacetamide, N-alkyl-N-vinyl-formamide or N-alkyl-N-vinylacetamide. Among the N-vinylcarboxamides, N-vinyl-formamide is preferably used, and homopolymers of N-vinylformamide are particularly preferred.

According to the invention, "water-soluble polymers" is understood as meaning that in general at least 0.01% by weight of the polymer dissolves in water at room temperature and forms a clear one-phase solution without turbidity up to a concentration of 90% by weight in water.

According to the invention, the water-soluble polymers of N-vinylcarboxamides may comprise, in addition to 100 to 20% by weight of the N-vinylcarboxamides, if appropriate also from 0 to 80, preferably from 5 to 30, % by weight of comonomers incorporated in the form of polymerized units based in each case on the total composition of the polymers. For example, the water-soluble polymers comprise 40-80% by weight, preferably 50-70% by weight and particularly preferably 55-65% by weight of the N-vinylcarboxamides and 20-60% by weight, preferably 30-50% by weight and particularly preferably 35-45% by weight of comonomers incorporated in the form of polymerized units. The comonomers are, for example, monoethylenically unsaturated carboxylic acids having 3 to 8 carbon atoms, such as acrylic acid, methacrylic acid, dimethacrylic acid, ethacrylic acid, maleic acid, citraconic acid, methylenemalonic acid, allylacetic acid, vinylacetic acid, crotonic acid, fumaric acid, mesaconic acid and itaconic acid. From this group of monomers, acrylic acid, methacrylic acid, maleic acid or mixtures of said carboxylic acids are preferably used. The monoethylenically unsaturated carboxylic acids are used either in the form of the free acids or in the form of their alkali metal, alkaline earth metal or ammonium salts. However, they can also be used as salts of the respective acid and triethylamine, ethanolamine, diethanolamine, triethanolamine, morpholine, diethylenetriamine or tetraethylenepentamine.

Further suitable comonomers are, for example, the esters, amides and nitriles of the abovementioned carboxylic acids, e.g. methyl acrylate, ethyl acrylate, methyl methacrylate, ethyl methacrylate, hydroethyl acrylate, hydroxypropyl acrylate, hydroxy-butyl acrylate, hydroxyethyl methacrylate, hydroxypropyl methacrylate, hydroxyisobutyl acrylate, hydroxyisobutyl methacrylate, monomethyl maleate, dimethyl maleate, monoethyl maleate, diethyl maleate, 2-ethylhexyl acrylate, 2-ethylhexyl methacrylate, acrylamide, methacrylamide, N-dimethylacrylamide, N-tert-butylacrylamide, acrylonitrile, methacrylonitrile, dimethylaminoethyl acrylate, diethylaminoethyl acrylate, diethylaminoethyl methacrylate and the salts of the last-mentioned basic monomers with carboxylic acids or mineral acids and the quaternized products of the basic (meth)acrylates. Acrylamide or methacrylamide is preferably used.

In addition, acrylamidoglycolic acid, vinylsulfonic acid, allylsulfonic acid, methallyl-sulfonic acid, styrenesulfonic acid, 3-sulfopropyl acrylate, 3-sulfopropyl methacrylate or acrylamidomethylpropanesulfonic acid and monomers comprising phosphonic acid groups, such as vinylphosphonic acid, allylphosphonic acid or acrylamidomethyl-propanephosphonic acid, are suitable as further comonomers incorporated in the form of polymerized units. The monomers comprising acid groups can be used in the polymerization in the form of the free acid groups and in a form partly or completely neutralized with bases.

Further suitable copolymerizable compounds are N-vinylpyrrolidone, N-vinylcapro-lactam, N-vinylimidazole, N-vinyl-2-methylimidazole, N-vinyl-4-methylimidazole, vinyl acetate, vinyl propionate or styrene and compounds having more than one polymerizable double bond, such as, for example, diallylammonium chloride, ethylene glycol dimethacrylate, diethylene glycol diacrylate, allyl methacrylate, trimethylol-propane triacrylate, triallylamine, tetraallyloxyethane, triallyl cyanurate, diallyl maleate, tetraallylethylenediamine, divinylideneurea, pentaerythrityl diallyl ether, pentaerythrityl triallyl ether and pentaerythrityl tetraallyl ether, N,N'-methylenebisacrylamide or N,N'-methylenebismethacrylamide.

In a preferred embodiment, the water-soluble polymers comprise 40-80% by weight, preferably 50-70% by weight and particularly preferably 55-65% by weight of N-vinylformamide and 20-60% by weight, preferably 30-50% by weight and particularly preferably 35-45% by weight of N-vinylpyrrolidone incorporated in the form of polymerized units.

It is of course also possible to use mixtures of said comonomers. For example, mixtures of from 50 to 100% by weight of N-vinylformamide and from 0 to 50% by weight of one or more of said comonomers are suitable for the preparation of the water-soluble N-vinylcarboxamide polymers according to the invention.

If, when polymerized alone, said comonomers do not give water-soluble polymers, the polymers comprising N-vinylcarboxamide units comprise these comonomers incorporated in the form of polymerized units only in amounts such that the copolymers are still water-soluble.

In contrast to water-in-oil polymer emulsions, no organic solvents are required for the aqueous dispersions according to the invention. As is evident from the prior art, concentrated solutions of inorganic salts are a conventional means of preparing aqueous dispersions of water-soluble polymers. As a result, the known dispersions comprise a very high salt load. The aqueous dispersions, according to the invention, of water-soluble polymers are in comparison substantially salt-free. Here, "substantially salt-free" means that any amount of inorganic salts which is still present in the dispersions is very small, preferably less than about 1% by weight, particularly preferably less than 0.5% by weight and very particularly preferably less than 0.3% by weight in total, based in each case on the total weight of the aqueous dispersion.

The aqueous dispersions, according to the invention, of water-soluble polymers of N-vinylcarboxamides preferably have a high polymer content and preferably comprise polymers having high molar masses and simultaneously a low viscosity. The molar masses $M_w$ of the polymers comprising N-vinylcarboxamide units are, for example, $5 \times 10^4$ to $5 \times 10^7$, preferably $2 \times 10^5$ to $5 \times 10^6$ (number average in each case).

The aqueous dispersions according to the invention comprise at least one preferably water-soluble polymeric stabilizer having a comb-like molecular structure, which is obtained by copolymerization of monomer mixtures comprising macromonomers and which is present as an anion under the polymerization conditions. The structure of the stabilizers according to the invention can be described, for example, as a hydrocarbon backbone with anionic groups and nonpolar polyalkylene glycol side chains. In the aqueous polymerization medium, these stabilizers act, for example, as a stabilizer and/or as a precipitating agent for the polymer particles forming. They are referred to as stabilizers in the following text.

According to the invention, macromonomers are understood as meaning substances which, with a molecular weight of preferably less than 500 000 D, in particular in the range of from 300 to 100 000 D, particularly preferably in the range of from 500 to 20 000 D, very particularly preferably in the range of from 800 to 15 000 D, have a substantially linear molecular structure and carry a polymerizable group at one end.

In a preferred embodiment of the invention, macromonomers which are based on polyalkylene glycols and are provided with a polymerizable group at one end are used. This may be, for example, a vinyl, allyl, (meth)acrylic acid or (meth)acrylamide group, the corresponding macromonomers being described by the following formulae:

$$CH_2=CR^2-P, \qquad (II)$$

$$CH_2=CH-CH_2-P, \quad (III)$$

$$CH_2=CH-CH_2-NH-R^3-P, \quad (IV)$$

$$CH_2=CH-CH_2-CO-P, \quad (V)$$

$$CH_2=CR^2-CO-P, \quad (VI)$$

$$CH_2=CR^2-CO-NH-R^3-P, \quad (VII)$$

$$CH_2=CR^2-CO-O-R^3-P, \quad (VIII)$$

where
$R^2$ is H or methyl,
$R^3$ is as defined below and
P is a polyalkylene glycol radical of the general formula $$P=-\{-O-(R^3O)_u-R^4O)_v-(R^5O)_w-[-A-(R^6O)_x-(R^7O)_y-(R^8O)_z-]_s-R^9\}_n$$

in which the variables, independently of one another, have the following meaning:
$R^9$ is hydrogen, $NH_2$, $C_1$-$C_{24}$-alkyl, $R^{10}-C(=O)-$, $R^{10}-NH-C(=O)-$;
$R^3$ to $R^8$ are $$-(CH_2)_2-, -(CH_2)_3-, -(CH_2)_4-, -CH_2-CH(CH_3)-, -CH_2-CH(CH_2-CH_3)-, -CH_2-CHOR^{11}-CH_2-;$$

$R^{10}$ is $C_1$-$C_{24}$-alkyl;
$R^{11}$ is hydrogen, $C_1$-$C_{24}$-alkyl, $R^{10}-C(=O)-$;
A is $-C(=O)-O-$, $-C(=O)-B-C(=O)-O-$,
  $-C(=O)-NH-B-NH-C(=O)-O-$;
B is $-(CH_2)_t-$, arylene, optionally substituted;
n is from 1 to 8;
s is from 0 to 500, preferably from 0 to 20;
t is from 1 to 12;
u is from 1 to 5000, preferably from 1 to 1000, particularly preferably from 1 to 100;
v is from 0 to 5000, preferably from 0 to 1000;
w is from 0 to 5000, preferably from 0 to 1000;
x is from 1 to 5000, preferably from 1 to 1000;
y is from 0 to 5000, preferably from 0 to 1000;
z is from 0 to 5000, preferably from 0 to 1000.

Those compounds in which the polyalkylene glycol radical P is derived from a polyalkylene glycol which has been prepared using ethylene oxide, propylene oxide and butylene oxide and polytetrahydrofuran are preferred. Depending on the type of monomer building blocks used here, the result is a polyalkylene glycol radical P having the following structural units:

$$-(CH_2)_2-O-, -(CH_2)_3-O-, -(CH_2)_4-O-, -CH_2-CH(CH_3)-O-, -CH_2-CH(CH_2-CH_3)-O-, -CH_2-CHOR^{11}-CH_2-O-.$$

The terminal primary hydroxyl group of the polyalkylene glycol radical $P(R^9=H)$ may either be present in free form or be etherified or esterified with alcohols having a chain length of $C_1$-$C_{24}$ or with carboxylic acids having a chain length of $C_1$-$C_{24}$. However, they can also be exchanged for primary amino groups by reductive amination with hydrogen/ammonium mixtures under pressure or be converted into terminal amino-propyl groups by cyanoethylation with acrylonitrile and hydrogenation.

Alkyl radicals $R^9$ to $R^{11}$ which may be mentioned are branched or straight $C_1$-$C_{24}$-alkyl chains, preferably methyl, ethyl, n-propyl, 1-methylethyl, n-butyl, 1-methylpropyl, 2-methylpropyl, 1,1-dimethylethyl, n-pentyl, 1-methylbutyl, 2-methylbutyl, 3-methylbutyl, 2,2-dimethylpropyl, 1-ethylpropyl, n-hexyl, 1,1-dimethylpropyl, 1,2-dimethylpropyl, 1-methylpentyl, 2-methylpentyl, 3-methylpentyl, 4-methylpentyl, 1,1-dimethylbutyl 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, n-heptyl, 2-ethylhexyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl or n-eicosyl.

Branched or straight $C_1$-$C_{12}$-alkyl chains, particularly preferably $C_1$-$C_6$-alkyl chains, may be mentioned as preferred members of the abovementioned alkyl radicals.

In addition to about 90 to 10% by weight of the macromonomers described, the stabilizers also comprise as a rule from about 10 to 90, preferably from 25 to 70, % by weight of comonomers which are incorporated in the form of polymerized units and carry deprotonatable groups which may be present in anionic form under the polymerization conditions. Comonomers may be, for example, monoethylenically unsaturated carboxylic acids having 3 to 8 carbon atoms, such as acrylic acid, methacrylic acid, dimethacrylic acid, ethacrylic acid, maleic acid, citraconic acid, methylenemalonic acid, allylacetic acid, vinylacetic acid, crotonic acid, fumaric acid, mesaconic acid and itaconic acid. From this group of comonomers, acrylic acid, methacrylic acid, maleic acid or mixtures of said carboxylic acids are preferably used. The monoethylenically unsaturated carboxylic acids are used in the copolymerization either in the form of the free acids or in the form of their alkali metal, alkaline earth metal or ammonium salts. However, they can also be used as salts of the respective acid and triethylamine, ethanolamine, diethanolamine, triethanolamine, morpholine, diethylenetriamine or tetraethylenepentamine.

Further suitable comonomers are, for example, the esters, amides and nitriles of the abovementioned carboxylic acids, e.g. methyl acrylate, ethyl acrylate, methyl methacrylate, ethyl methacrylate, hydroethyl acrylate, hydroxypropyl acrylate, hydroxybutyl acrylate, hydroxyethyl methacrylate, hydroxypropyl methacrylate, hydroxyisobutyl acrylate, hydroxyisobutyl methacrylate, monomethyl maleate, dimethyl maleate, monoethyl maleate, diethyl maleate, 2-ethylhexyl acrylate, 2-ethylhexyl methacrylate, acrylamide, methacrylamide, N-dimethylacrylamide, N-tert-butylacrylamide, acrylonitrile or methacrylonitrile, which can be hydrolyzed to the corresponding free carboxylic acids after their incorporation in the form of polymerized units into the polymeric stabilizers.

It is of course also possible to use mixtures of said comonomers. The monomers may be randomly distributed in the copolymers or be present as so-called block polymers.

If, when polymerized alone, said comonomers do not give water-soluble polymers, the stabilizers comprising macromonomers comprise these comonomers incorporated in the form of polymerized units only in amounts such that the stabilizers are still water-soluble.

For the preparation of the stabilizers, the macromonomers described are preferably subjected to a free radical polymerization in an aqueous medium with one or more of said comonomers. Polymerization initiators which form free radicals under the polymerization condition are preferably used. Suitable compounds of this type are, for example, hydrogen peroxide, peroxodisulfates, peroxides, hydroperoxides, redox catalysts and non-oxidizing initiators, such as azo compounds, which decompose into free radicals under the polymerization conditions. Suitable azo compounds are, for example, 2,2'-azobis(2-amidinopropane) dihydrochloride, 2,2'-azobis(N,N'-dimethyleneisobutyramidine) dihydrochloride, 2,2'-azobis(2,4-dimethylvaleronitrile), 2,2'-azobis[2-methyl-N-(2-hydroxyethyl)propionamide] or 2,2'-azobisisobutyronitrile. It is of course also possible to use mixtures of different initiators. Azo compounds are preferably used.

For controlling the molecular weight of the resulting stabilizers, the polymerization can be carried out in the presence of polymerization regulators. Suitable polymerization regulators are, for example, compounds comprising sulfur in bound form, such as dodecyl mercaptan, thioglycolic acid, thioacetic acid and mercapto alcohols, such as mercaptoethanol, mercaptopropanols and mercaptobutanols. In addition, inorganic salts, such as hypophosphites or bisulfites, for example sodium hypophosphite or sodium bisulfite, formic acid, isopropanol or hydrazine in the form of salts of strong acids can also be used.

The aqueous stabilizer solutions obtained should as a rule be freed from inorganic salts for their further use. The removal of inorganic salts from the stabilizer solutions is appropriate preferably when their usability would be unfavorably influenced by these salts or if the feature "substantially salt-free" could not be fulfilled when they are used for the preparation of the dispersions according to the invention. Particularly with the use of inorganic salts as polymerization regulators (such as sodium hypophosphite or sodium bisulfite) in the stabilizer preparation, these should be removed before use for further polymerizations.

The salt removal can be effected, for example, by customary osmotic methods, such as dialysis or ultrafiltration, which are familiar to the person skilled in the art. As a rule, semipermeable membranes or porous filter bodies which, owing to their pore size, are permeable to low molecular weight ions of inorganic salts but not to higher molecular weight compounds, such as, for example, the stabilizers according to the invention, are used here.

In addition salt removal can also be effected, as a rule, by methods which permit preparative separation according to molar masses, such as, for example, by size exclusion chromatography, ultracentrifuging, field flow fractionation (FFF) or hydrodynamic fractionation (HDF).

Furthermore, inorganic salts can also be separated off by precipitation, it being possible for both salts and the polymers to be selectively precipitated and, for example, to be separated from one another by filtering off or decanting. The actual precipitation can be initiated, for example, by adding precipitating reagents which, for example, convert the dissolved inorganic salts into insoluble products. In addition, precipitations can also be induced by addition or change of the solvent and/or by temperature changes.

Moreover, salt removal can also be carried out with the use of ion exchangers. Appropriate methods are known per se to the person skilled in the art.

The invention also relates to a process for the preparation of substantially salt-free aqueous dispersions of water-soluble polymers of N-vinylcarboxamides by free radical polymerization in an aqueous medium in the presence of at least one anionic polymeric stabilizer having a comb-like molecular structure and, if appropriate, further polymeric assistants, the stabilizers being obtained by copolymerization of macromonomers and further comonomers.

In a preferred embodiment of the process, at least one N-vinylcarboxamide is polymerized, if appropriate together with other comonomers, in an aqueous medium in the presence of at least one anionic polymeric stabilizer having a comb-like molecular structure and, if appropriate, further polymeric assistants, the stabilizer or the stabilizers having been obtained by copolymerization of macromonomers and further comonomers as an aqueous solution having a solids content of from 1 to 60% by weight, preferably from 20 to 50% by weight, at temperatures of from 30 to 100° C. with the use of from 0.001 to 5% by weight (based on the monomers used) of an initiator which forms free radicals under the polymerization conditions at a pH in the range of from 4 to 8, preferably from 5.5 to 7.

Further polymeric assistants which are suitable are, for example, those substances which are capable of displacing the resulting water-soluble polymers of N-vinyl-carboxamides from the aqueous phase. Compounds such as polyethylene glycol, polypropylene glycol, copolymers of ethylene glycol and propylene glycol, polyvinyl acetate, polyvinyl alcohol, polyvinylpyridine, polyvinylimidazole, polyvinylsuccinimide, polydiallyldimethylammonium chloride, polyethylenimine and mixtures thereof are particularly suitable for this purpose. The molar masses of these polymeric assistants are preferably from 1000 to 100 000 D. They may be present in the dispersions according to the invention in an amount of from 1 to 40% by weight.

The monomers used according to the invention for the preparation of both the water-soluble polymers of N-vinylcarboxamides and the polymeric stabilizers are preferably subjected to free radical polymerization, i.e. polymerization initiators which form free radicals under the polymerization conditions are used. Suitable compounds of this type are, for example, hydrogen peroxide, peroxodisulfates, peroxides, hydroperoxides, redox catalysts and nonoxidizing initiators, such as azo compounds, which decompose into free radicals under the polymerization conditions. Suitable azo compounds are, for example, 2,2'-azobis(2-amidinopropane) dihydrochloride, 2,2'-azobis(N,N'-dimethyleneisobutyramidine) dihydrochloride, 2,2'-azobis(2,4-dimethylvaleronitrile), 2,2'-azobis[2-methyl-N-(2-hydroxyethyl)propionamide] or 2,2'-azobisisobutyronitrile. It is of course also possible to use mixtures of different initiators. Azo compounds are preferably used.

If dispersions of the water-soluble polymers of N-vinylcarboxamides having low molecular weights are desired it is possible, for example, to increase the amounts of initiator which are usually used in the polymerization, so that amounts of initiator which are outside the abovementioned range for the amounts of initiator can also be used. Aqueous dispersions of low molecular weight homo- and copolymers of the suitable N-vinylcarboxamides can also be obtained by carrying out the polymerization in the presence of polymerization regulators and, if appropriate, simultaneously using a larger amount of initiator than is usually required. Suitable polymerization regulators are, for example, compounds comprising sulfur in bound form, such as dodecyl mercaptan, thioglycolic acid, thioacetic acid and mercapto alcohols, such as mercaptoethanol, mercaptopropanols and mercaptobutanols. In addition, hypophosphites or bisulfites, for example sodium hypophosphite or sodium bisulfite, formic acid, isopropanol or hydrazine in the form of salts of strong acids can be used as polymerization regulators.

If dispersions of the water-soluble polymers of N-vinylcarboxamides having high molecular weights are desired, it is possible on the other hand also to reduce the amounts of initiator which are usually used in the polymerization, so that here too it is possible to use amounts of initiator which are outside the abovementioned range for the amounts of initiator. Aqueous dispersions of high molecular weight homo- and copolymers of the suitable N-vinylcarboxamides can also be obtained by carrying out the polymerization in the presence of crosslinking agents. Suitable crosslinking agents are, for example, compounds having more than one polymerizable double bond, such as diallylammonium chloride, ethylene glycol dimethacrylate, diethylene glycol diacrylate, allyl methacrylate, trimethylolpropane triacrylate, triallylamine, tetraallyloxy-ethane, triallyl cyanurate, diallyl maleate, tetraallylethylenediamine, divinylideneurea, pentaerythrityldiallyl ether, pentaerythrityl triallyl ether and pentaerythrityl tetraallyl ether, N,N'-methylenebisacrylamide or N,N'-methylenebismethacrylamide.

The molecular weights of the water-soluble polymers of N-vinylcarboxamides which are present in the dispersions can be characterized with the aid of the K values according to Fikentscher. The K values are up to 400 and are preferably in the range of from 130 to 220. From light scattering experiments, it follows that a K value of 250 corresponds to an average molecular weight of the polymers of about 7 000 000 dalton.

According to the invention, the water-soluble polymers of N-vinylcarboxamides can be hydrolyzed to give polymers comprising vinylamine units. Thus, in each case polymers comprising vinylamine units are formed, for example, by eliminating formyl groups from polymers comprising N-vinylformamide units or by eliminating the $CH_3$—CO— group from polymers comprising N-vinylacetamide units. The elimination can be carried out partially or completely. For example, the degree of hydrolysis of the N-vinyl-carboxamides is 1-100 mol %, based on the number of carboxamide units, preferably 20-90 mol %, particularly preferably 40-85 mol % and especially preferably 60-80 mol %. If the hydrolysis is carried out in the presence of acids, the vinylamine units of the polymers formed are present as ammonium salts. However, the hydrolysis can also be carried out with the aid of bases, for example of metal hydroxides, in particular of alkali metal and alkaline earth metal hydroxides. Sodium hydroxide or potassium hydroxide is preferably used. In particular cases, the hydrolysis can also be carried out with the aid of ammonia or amines. In the hydrolysis in the presence of bases, the vinylamine units are present in the form of the free bases.

Suitable hydrolysis agents are preferably mineral acids, such as hydrogen halides, which can be used in gaseous form or as aqueous solution. Concentrated hydrochloric acid, sulfuric acid, nitric acid or phosphoric acid and organic acids, such as $C_1$- to $C_5$-carboxylic acids, and aliphatic or aromatic sulfonic acids are preferably used. For example, from 0.05 to 2, in particular from 1 to 1.5, mole equivalents of an acid are required per formyl group equivalent in the polymers comprising N-vinylformamide units incorporated in the form of polymerized units. The hydrolysis of the N-vinyl-formamide units takes place significantly more rapidly than that of the polymers having N-vinylacetamide units. If copolymers of the suitable N-vinylcarboxamides with other comonomers are subjected to the hydrolysis, the comonomer units present in the copolymer can also be chemically modified. Thus, vinyl alcohol units form, for example, from vinyl acetate units. Acrylic acid units form from methyl acrylate units in the hydrolysis and acrylamide or acrylic acid units are formed from acrylonitrile units. The hydrolysis of the N-vinylformamide and/or vinylacetamide units of the water-soluble polymers can be carried out up to 3 to 100, preferably 5 to 40, %. The aqueous dispersions of the water-soluble polymers of N-vinylcarboxamides are surprisingly not destroyed in the hydrolysis.

The aqueous dispersions, according to the invention, of the water-soluble polymers of N-vinylcarboxamides form clear aqueous polymer solutions on dilution with water. The viscosity of the dispersions is, for example, from 300 to 50 000 mPa·s, preferably from 400 to 10 000 mPa·s (determined in a Brookfield viscometer at 20° C., spindle number 4 and 20 rpm). The mean particle size in the dispersions of the water-soluble polymers of N-vinylcarboxamides is generally in the range of from 0.1 to 50 μm.

The aqueous dispersions according to the invention which may comprise both unhydrolyzed and hydrolyzed water-soluble polymers of N-vinylcarboxamides are used as drainage aids, flocculants and retention aids and as wet and dry strength agents and as fixing agents in papermaking. The unhydrolyzed as well as the hydrolyzed aqueous dispersions can also be used as strength agents for paper, as fixing agents for soluble and insoluble anionic trash in papermaking and as papercoating compositions.

EXAMPLES

The K values were determined according to H. Fikentscher, Cellulose-Chemie, Volume 13, 58-64 and 71-74 (1932), as 0.1% strength solution in 5% strength sodium chloride solution at 25° C.

The viscosity of the dispersions was measured in each case with a Brookfield viscometer with a spindle no. 4 at 20 rpm and a temperature of 20° C.

The data in % are percent by weight.

The degree of hydrolysis was determined by polyelectrolyte titration (PET) according to D. Horn, Progr. Colloid & Polymer Sci. 65, 251-264 (1978).

The particle size was determined by optical microscopy by averaging the coarsely measured diameters of about 50 individual particles.

Example 1

Macromonomer 1

1540 g of monomethylpolyethylene glycol (average molar mass: 1000), 353 g of methacrylic acid, 148 g of acrylic acid, 20 g of p-toluenesulfonic acid, 1 g of pheno-thiazine and 453 g of toluene were refluxed while bathed in nitrogen until water no longer formed and the acid number was constant.

Example 2

Macromonomer 2

357 g of monomethylpolyethylene glycol (average molar mass: 1000), 126 g of methacrylic acid, 12 g of p-toluenesulfonic acid, 0.1 g of phenothiazine and 1.43 g of hypophosphorous acid (50% strength) were stirred for 1 hour at 80° C. and then for several hours at 120° C. until the acid number was constant.

Example 3

Stabilizer 1

340 g of distilled water were heated to reflux temperature under an inert gas atmosphere and at the same time 380 g of the macromonomer solution from example 1 were metered in over 5 hours, a solution of 25 g of water and 4.7 g of sodium peroxodisulfate was metered in over 5 hours and 15 minutes and 35 g of a 36% strength sodium bisulfite solution were metered in likewise over 5 hours and 15 minutes. Refluxing was then effected for a further hour. During the entire reaction time, toluene was removed continuously. After cooling to room temperature, neutralization was effected to pH 6.9 with 46 g of sodium hydroxide solution (50% strength). A polymer solution having a K value (1% in water) of 30.9 and a solids content of 46% was obtained.

Example 4

Stabilizer 2

280 g of distilled water were heated to reflux temperature under an inert gas atmosphere and at the same time 250 g of a macromonomer solution from example 2, mixed with 50 g of water, were metered in over 5 hours, a solution of 22 g of water and 3.6 g of sodium peroxodisulfate was metered in over 5 hours and 15 minutes and a solution of 9 g of sodium hypophosphite in 11 g of water was metered in likewise over 5 hours and 15 minutes. Refluxing was then effected for a further hour. During the entire reaction time, toluene was removed continuously. After cooling to room temperature, neutralization was effected to pH 6.7 with 39 g of sodium hydroxide solution (50% strength). A polymer solution having a K value (1% in water) of 38.8 and a solids content of 29.7% was obtained.

The polymer solution thus prepared was then dialysed for salt removal. For this purpose, 100 g of the polymer solution were introduced into a dialysis tube ("Por Biotech Cellulose Ester (CE) Dialysis Membrane", MWCO 500, diameter 20) from Medicell International Ltd., 239 Liverpool Road, London N1 1LX, UK, the dialysis tube was closed and dialysis was effected for four days in 10 liters of distilled water. The distilled water was changed twice per day. The content of the dialysis tube was then concentrated again to a solids content of 27.2% by means of a rotary evaporator.

Example 5

488 g of distilled water, 200 g of polyethylene glycol (average molar mass: 1500), 58.4 g of stabilizer solution from example 3 and 2.5 g of sodium dihydrogen phosphate were dissolved at 60° C. and nitrogen was then passed through the solution. Thereafter, 250 g of N-vinylformamide (purity >98%) were added and the pH was adjusted to 6.75. Thereafter, 1.25 g of 2,2'-azobis(2-methylpropionamidine) dihydrochloride were added and the internal temperature was kept at 60° C. while continuously passing through nitrogen until the reaction had ceased. A milky white dispersion having a viscosity of 600 mPa·s, a particle size of about 1 μm and a K value of 160 was obtained.

Example 6

As for example 5 except that 175 g of polyethylene glycol (average molar mass: 1500), 454 g of distilled water and 117 g of stabilizer solution from example 3 were used. A milky white dispersion having a viscosity of 750 mPa·s, a particle size of about 1 μm and a K value of 142 was obtained.

Example 7

As for example 5, except that polyethylene glycol was replaced by 200 g of monomethylpolyethylene glycol (average molar mass: 700).

A milky white dispersion having a viscosity of 500 mPa·s, a particle size of about 1 μm and a K value of 167 was obtained.

Example 8a

Polymerization 400 g of polyethylene glycol (average molar mass: 1500), 5 g of sodium dihydrogen phosphate, 131 g of stabilizer solution from example 3 and 927 g of demineralized water were heated to 55° C. with stirring. The pH was adjusted to 6.75 with phosphoric acid (75%) and the mixture was blanketed by a continuous stream of nitrogen. Thereafter, 30 g of an 8% strength V50-(2,2-azobis(2-amidinopropane) dihydrochloride) solution were metered in in 12 minutes and 100 g of N-vinylformamide in a further 12 minutes, in succession. After the end of the addition of the N-vinylformamide, a further 400 g of N-vinylformamide were metered in in 4 hours. Internal temperature was kept at 55° C. until the reaction had ceased. After the end of the reaction, postpolymerization was effected for 2 hours at 60° C. with addition of 7.5 g of 8% strength V50-(2,2-azobis(2-amidinopropane) dihydrochloride) solution. A white dispersion having a viscosity of 830 mPa·s, a K value of 157.5 and a particle size of about 1 μm was obtained.

Example 8b

Hydrolysis 21 g of sulfuric acid (96%) were added with stirring at 60° C. in the course of 2 hours to 1000 g of the dispersion prepared in the polymerization under example 8a. The mixture was then stirred for 5 hours at 60° C.

A white dispersion having a viscosity of 1200 mPa·s, a degree of hydrolysis of 7.4% and a polymer content of 23.8% was obtained.

Example 9

476 g of distilled water, 200 g of polyethylene glycol (average molar mass: 1500), 70 g of stabilizer solution of example 3 and 3.5 g of sodium dihydrogen phosphate were mixed with stirring and heated to 60° C., and nitrogen was passed through the solution for blanketing. Thereafter, 300 g of N-vinylformamide (purity >98%) were added and the pH was adjusted to 6.75. Thereafter, 1.5 g of 2,2'-azobis(2-methylpropionamidine) dihydrochloride were added and the internal temperature was kept at 60° C. while continuously passing through nitrogen until the reaction had ceased. A milky white dispersion having a viscosity of 1950 mPa·s, a particle size of about 1 μm and a K value of 158 was obtained.

Example 10a

Polymerization 200 g of polyethylene glycol (average molar mass: 1500), 2.5 g of sodium dihydrogen phosphate, 250 g of N-vinylformamide, 92 g of stabilizer solution from example 4 and 451 g of demineralized water were mixed with stirring and the pH was adjusted to 6.75 with phosphoric acid (75%). The reaction mixture was heated to 60° C. and was freed from oxygen by a continuous stream of nitrogen. After the addition of 1.25 g of V50-(2,2-azobis(2-amidinopropane) dihydrochloride), the internal temperature was kept at 60° C. until the reaction had ceased.

A white dispersion having a viscosity of 1200 mPa·s, a K value of 165 and a particle size of about 1 μm was obtained.

Example 10b

Hydrolysis 41 g of sulfuric acid (96%) were added with stirring at 60° C. over the course of 1 hour and 30 minutes to 781 g of the dispersion prepared in the polymerization under example 10a and the mixture was then stirred for 5 hours at 60° C.

A white dispersion having a viscosity of 800 mPa·s and a degree of hydrolysis of 15% was obtained.

Example 11a

Polymerization 200 g of an alkyl-modified random polypropylene glycol/polyethylene glycol copolymer (Mw about 2000, hydroxyl number about 30), 2.5 g of sodium dihydrogen phosphate, 250 g of N-vinylformamide, 245 g of stabilizer solution from example 4, diluted to a solids content of 10.2% by weight, and 300 g of demineralized water are mixed with stirring and the pH was adjusted to 6.75 with phosphoric acid (75%). The reaction mixture was heated to 60° C. and freed from oxygen by a continuous stream of nitrogen. After the addition of 1.25 g of V50-(2,2-azobis(2-amidinopropane) dihydrochloride), the internal temperature was kept at 60° C. until the reaction had ceased. A white dispersion having a viscosity of 900 mPa·s, a K value of 149 and a particle size of about 1 µm was obtained.

Example 11b

Hydrolysis 41 g of sulfuric acid (96%) were added at 60° C. in the course of 1 hour and 30 minutes to 782 g of the dispersion prepared in the polymerization under example 11a and the mixture was then stirred for 5 hours at 60° C. A white dispersion having a viscosity of 700 mPa·s and a degree of hydrolysis of 15% was obtained.

Example 12a

Polymerization 180 g of polyethylene glycol (Mw about 1500), 3.0 g of phosphoric acid (75%), 44.6 g of stabilizer solution from example 4 and 567 g of demineralized water were mixed with stirring and the pH was adjusted to 6.75 with sodium hydroxide solution (25%). 120 g of N-vinylformamide and 80 g of N-vinylpyrrolidone were then added. The reaction mixture was heated to 55° C. and was freed from oxygen by a continuous stream of nitrogen. After the addition of 1.20 g of V50-(2,2-azobis(2-amidinopropane) dihydro-chloride), the internal temperature was kept at 55° C. until the reaction had ceased. A white dispersion having a viscosity of 584 mPa·s, a K value of 130 and a particle size of about 3 µm was obtained.

Example 12b

Hydrolysis 32 g of hydrochloric acid (38%) were added with stirring at 60° C. over the course of 4 hours to 200 g of the dispersion prepared in the polymerization under example 12a and the mixture was then stirred for 2 hours at 60° C. A white dispersion having a viscosity of 160 mPa·s and a degree of hydrolysis of 68% (based on the VFA content of the polymer) and a particle size of about 3 µm was obtained.

Example 12c

Thickening

A dispersion of the polymer prepared in example 12b, diluted to 4%, was adjusted to pH 5.3 so that the solution had a viscosity of 5150 mPa·s. When the pH was increased to 6, the solution had a viscosity of 19 000 mPa·s (after some time, the viscosity increased to 76 000 mPa·s). A dispersion diluted to 6% had a viscosity of 168 000 mPa·s even at pH 5.6 (after some time, increased to 664 000 mPa·s).

Example 12d

Hydrolysis 16 g of hydrochloric acid (38%) were added with stirring at 60° C. over the course of 2 hours to 202 g of the dispersion prepared in the polymerization under example 12a and the mixture was then stirred for 4 hours at 60° C. A white dispersion having a viscosity of 216 mPa·s and a degree of hydrolysis of 39% (based on the VFA content of the polymer) and a particle size of about 4 µm was obtained.

Example 12e

Thickening

A dispersion of the polymer prepared in example 12d, diluted to 4%, was adjusted to pH 6.2 so that the solution had a viscosity of 824 mPa·s. When the pH was increased to 7.3, the solution had a viscosity of 27 000 mPa·s.

Example 12f

Hydrolysis 8 g of hydrochloric acid (38%) were added with stirring at 60° C. over the course of 1 hour to 200 g of the dispersion prepared in the polymerization under example 12a and the mixture was then stirred for 5 hours at 60° C. A white dispersion having a viscosity of 280 mPa·s and a degree of hydrolysis of 21% (based on the VFA content of the polymer) and a particle size of about 3 µm was obtained.

Example 12g

Thickening

A dispersion of the polymer prepared in example 12f, diluted to 4%, was adjusted to pH 7.3 so that the solution had a viscosity of 644 mPa·s. When the pH was increased to 8, the solution had a viscosity of 1380 mPa·s.

We claim:

1. An aqueous dispersion of water-soluble polymers of N-vinylcarboxamides, wherein the aqueous dispersion is substantially salt-free and comprises anionic polymeric stabilizers having a comb-like molecular structure which are produced by copolymerization of monomer mixtures comprising macromonomers having a substantially linear molecular structure and carrying a polymerizable group at one end.

2. The aqueous dispersion according to claim 1, wherein the water-soluble polymers comprise units of N-vinylformamide, N-vinylacetamide, N-methyl-N-vinylformamide and/or N-methyl-N-vinylacetamide.

3. The aqueous dispersion according to claim 1, wherein 100 parts by weight of the dispersion comprise (i) from 5 to 50 parts by weight of water-soluble polymers of N-vinylcarboxamides, (ii) from 1 to 30 parts by weight of at least one stabilizer having a comb-like molecular structure and (iii) from 94 to 20 parts by weight of water.

4. The aqueous dispersion according to claim 1, wherein the viscosity of the dispersion is from 300 to 50 000 mPa·s.

5. The aqueous dispersion according to claim 1, wherein the polymer comprises polymer particles, which present have a mean particle size of from 0.1 to 50 μm.

6. The aqueous dispersion according to claim 1, wherein the macromonomers are selected from the group consisting of vinyl ethers, allyl ethers, allylamines, allyl esters, (meth) acrylates and (meth)acrylamides.

7. An aqueous dispersion, produced by a partial or complete hydrolysis of the water-soluble polymers of N-vinylcarboxamide present in the aqueous dispersion according to claim 1 to give polymers comprising vinylamine units, the dispersion remaining intact.

8. A process for the preparation of aqueous dispersions of water-soluble polymers of N-vinylcarboxamides, wherein at least one N-vinylcarboxamide is polymerized in an aqueous medium in the presence of at least one anionic polymeric stabilizer having a comb-like molecular structure, the stabilizer or the stabilizers being produced by copolymerization of monomer mixtures comprising macromonomers having a substantially linear molecular structure and carrying a polymerizable group at one end.

9. The process according to claim 8, wherein the water-soluble polymers comprise units of N-vinylformamide, N-vinylacetamide, N-methyl-N-vinylformamide and/or N-methyl-N-vinylacetamide.

10. The process according to claim 8, wherein the at least one N vinylcarboxamide is polymerized together with at least one comonomer.

11. A process for the preparation of aqueous dispersions, wherein an aqueous dispersion of water-soluble polymers of N-vinylcarboxamides, which dispersion is prepared by a process according to claim 8, is converted into an aqueous dispersion of polymers comprising vinylamine units by partial or complete hydrolysis, the dispersion remaining intact.

12. A method comprising using the aqueous dispersion according to claim 1 as a drainage aid, flocculant and retention aid, as a wet and dry strength agent, as a fixing agent in papermaking and as a papercoating composition, or as a thickener.

13. The aqueous dispersion according to claim 1, wherein the water-soluble polymers comprise units of N-vinylformamide.

14. The aqueous dispersion according to claim 13, wherein the water-soluble polymers comprise 40-80 wt % of N-vinylformamide units and 20-60 wt % of N-vinylpyrrolidone units.

15. The aqueous dispersion according to claim 13, wherein the water-soluble polymers comprise 50-70 wt % of N-vinylformamide units and 30-50 wt % of N-vinylpyrrolidone units.

16. The aqueous dispersion according to claim 13, wherein the water-soluble polymers comprise 55-65 wt % of N-vinylformamide units and 35-45 wt % of N-vinylpyrrolidone units.

17. The aqueous dispersion according to claim 1, wherein said monomer mixtures comprise 90-10 wt % of said macromonomers and 10-90% of monoethyleneically unsaturated carboxylic acids or their salts.

18. The aqueous dispersion according to claim 1, wherein the macromonomers have a molecular weight between 300 and 500,000 D.

19. The aqueous dispersion according to claim 1, wherein the macromonomers have a molecular weight between 800 and 15,000 D.

20. The aqueous dispersion according to claim 1, wherein the macromonomers are selected from the group consisting of the following formulae (II) through (VIII):

  (II)

  (III)

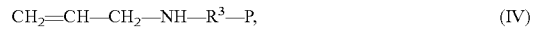  (IV)

  (V)

  (VI)

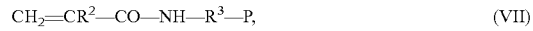  (VII)

  (VIII)

where
$R^2$ is H or methyl,
P is a polyalkylene glycol radical of the general formula:

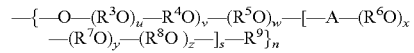

in which the variables, independently of one another, have the following meaning:
$R^9$ is hydrogen, $NH_2$, $C_1$-$C_{24}$-alkyl, $R^{10}$—C(=O)—, or $R^{10}$—NH—C(=O)—;
$R^3$ to $R^8$ are —$(CH_2)_2$—, —$(CH_2)_3$—, —$(CH_2)_4$—, —$CH_2$—$CH(CH_3)$—, —$CH_2$—$CH(CH_2$—$CH_3)$—, or —$CH_2$—$CHOR^{11}$—$CH_2$-;
$R^0$ is $C_1$-$C_{24}$-alkyl;
$R^{11}$ is hydrogen, $C_1$-$C_{24}$-alkyl, or $R^{10}$—C(=O)-;
A is —C(=O)—O—, —C(=O)—B—C(=O)—O—, or —C(=O)—NH—B—NH—C(=O)—O—;
B is —$(CH_2)_t$-, arylene, optionally substituted;
n is from 1 to 8;
s is from 0 to 500;
t is from 1 to 12;
u is from 1 to 5000;
v is from 0 to 5000;
w is from 0 to 5000;
x is from 1 to 5000;
y is from 0 to 5000; and
z is from 0 to 5000.

* * * * *